United States Patent

Lunde

[15] 3,690,766
[45] Sept. 12, 1972

[54] PHOTOGRAPHIC FILM DUPLICATOR

[72] Inventor: George G. Lunde, White Bear Lake, Minn.

[73] Assignee: Minnesota Mining and Manufacturing Company, St. Paul, Minn.

[22] Filed: Feb. 25, 1970

[21] Appl. No.: 14,095

[52] U.S. Cl. .................................355/111, 355/110
[51] Int. Cl. ............................................G03b 27/10
[58] Field of Search......355/108, 109, 110, 111, 104, 355/91

[56] References Cited

UNITED STATES PATENTS 3,468,606   9/1969   Wolf et al. ....................355/91
3,157,102   11/1964   Pfaff..........................355/111

Primary Examiner—Samuel S. Matthews
Assistant Examiner—Richard L. Moses
Attorney—Kinney, Alexander, Sell, Steldt & Delahunt

[57] ABSTRACT

A photographic film duplicator in which an original film is supported by its longitudinal edges at a constant radius from a line source of radiation at a duplicating station with the original film between the source of radiation and a radiation sensitive duplicating film in intimate contact with the original film to permit radiation from the source to be projected through the original film to image the duplicating film.

9 Claims, 3 Drawing Figures

PATENTED SEP 12 1972 3,690,766

INVENTOR.
GEORGE G. LUNDE
BY Kinney, Alexander,
Sell, Steldt & DeLaHunt
ATTORNEYS

PHOTOGRAPHIC FILM DUPLICATOR

This invention relates to apparatus for duplicating graphic information contained on an original photographic film and in one aspect to a duplicating station at which graphic information contained on the original film may be duplicated on a radiation sensitive duplicating film.

Prior art film duplicators for duplicating graphic information contained on an original photographic film have generally supported the original film and the sensitive duplicating film in intimate contact at the duplicating station on the surface of a cylindrical drum. A line source of radiation coincident with the axis of the support drum has been utilized to give uniform radiation on the surface of the drum and the drum has been at least partially transparent to permit radiation from the source to be projected through the original film to image the duplicating film. However, the material of which the transparent drum has been made has always provided some refraction and reflection, scattering some light rays from the uniform source producing non-uniform exposure of the original film and thereby some distortion in the image directed onto the duplicating film. Dirt accumulation on the transparent drum has produced further distortion of the image. To solve these problems some devices have placed the source of radiation outside of the support drum and projected the radiation towards the center of the drum. However, while eliminating some difficulties this method sacrifices the inherent uniform irradiation of the film attained by passing the film at a constant radius, such as on the surface of a drum, around a line source of radiation. Thus, in this latter method some means must be provided for assuring uniform irradiation of the film on the surface of the drum.

The present invention avoids the aforesaid difficulties by supporting only the longitudinal edges of the original film at a constant radius from a line source of radiation. This avoids the difficulty of the radiation being scattered through a transparent drum and dirt accumulation and preserves the simplicity of using a line source of radiation coincident with the axis of the drum.

The apparatus of the present invention includes a duplicating station at which graphic information contained on an original photographic film may be duplicated on a radiation sensitive duplicating film, which station comprises a source of radiation that is generally uniform from a centerline and means for supporting the longitudinal edges of an original film at a constant radius from the centerline of the radiation with the original film between the source of radiation and a radiation sensitive duplicating film having its sensitized coating in intimate contact with the image bearing coating of the original film to permit radiation from the source to be projected through the original film to image the duplicating film.

The above and further novel features and advantages of the present invention will become apparent after reading the following detailed description which refers to the accompanying drawing, wherein.

Figure 1:
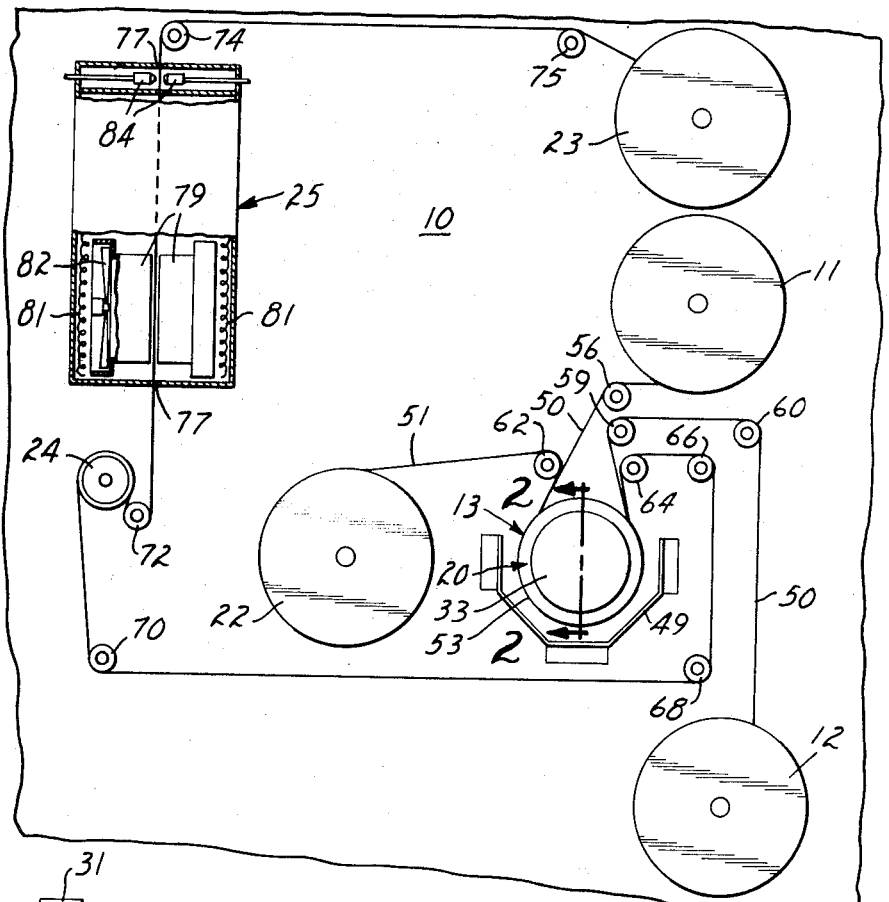
FIG. 1 is an elevation view of a film duplicator made in accordance with the present invention and showing the movement of an original film and a duplicating film.
Figure 2:
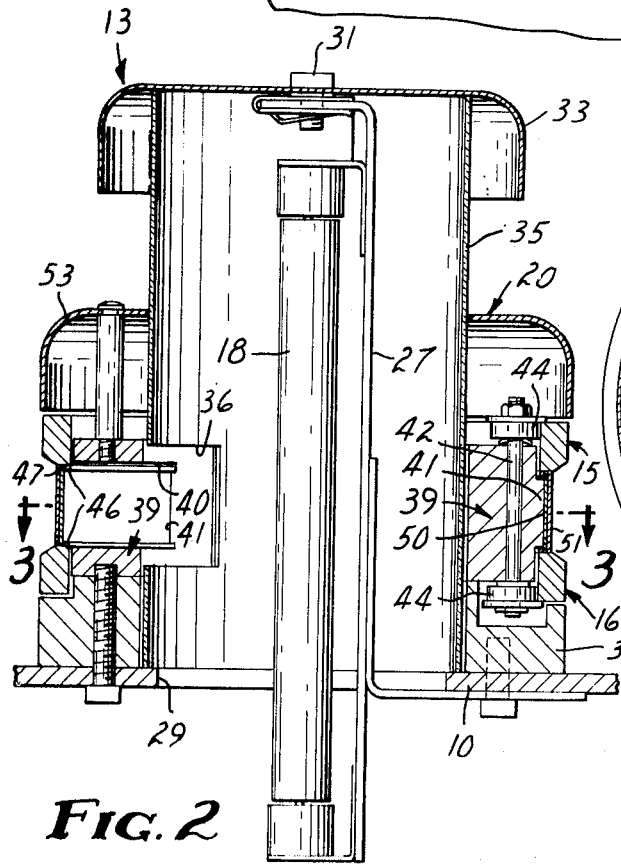
FIG. 2 is a sectional plan view taken along line 2—2 of FIG. 1.
Figure 3:
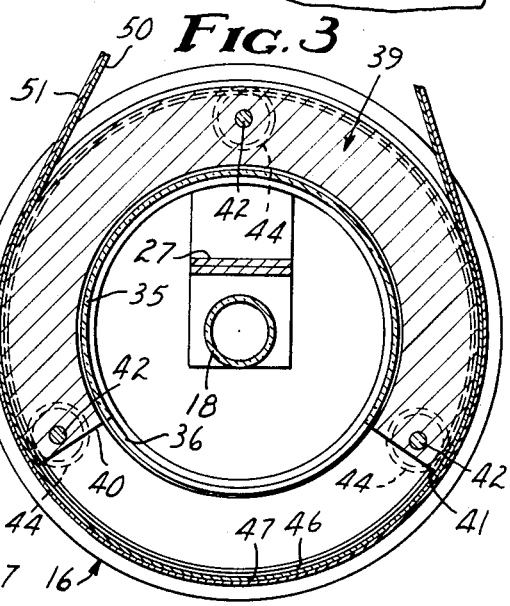
FIG. 3 is an elevational sectional view taken along line 3—3 of FIG. 2.

The film duplicator according to the present invention comprises a vertical main support frame or deck 10; an original film storage or supply reel 11; an original film take-up reel 12; a duplicating station 13 comprising a pair of freely rotatable rings 15 and 16, a line source of radiation 18 and a variable radiation shield 20 around the source of radiation; a duplicating film supply reel 22; a duplicating film take-up reel 23; means for guiding the duplicating film and the original film into register and intimate contact at the duplicating station; a drive capstan 24; and a film processor 25.

A fluorescent lamp 18 defines the source of radiation. This type of light source is used to produce generally uniform radiation at equal radial distances from a centerline along the centerline, the axis of the fluorescent tube. The fluorescent lamp 18 is supported by a bracket 27 that is secured to the support deck 10 to support the fluorescent lamp with its axis generally horizontal and perpendicular to the plane of the support deck 10 and extending partially through an aperture 29 formed in the support deck. A portion of the bracket 27 is turned over one end of the lamp and a fastener 31 extends through a central aperture in an opaque generally cylindrical cup 33 and is turned into the bracket coaxial with the fluorescent lamp 18. The cylindrical cup 33 is secured to and covers one end of an opaque hollow sheet metal exposure control cylinder 35; the cylinder 35 extending coaxially with the fluorescent lamp 18 between the cup 33 and the support deck 10 to surround the lamp 18.

A base ring 37 is secured to the support deck 10 around the opaque cylinder 35. An aperture ring 39 having the same internal diameter as the base ring 37 and a lesser external diameter is secured to the base ring around and coaxially with the opaque cylinder 35. The aperture ring 39 is formed with a slot 40 having a width slightly greater than the width of the film that is being used and extending approximately 120° around the circumference of the ring. The opaque exposure control cylinder 35 is also formed with a slot 36, which slot is aligned with and has a width greater than the slot 40 in the aperture ring 39 to permit radiation from the fluorescent lamp 18 to pass uniformly through the slot 40 in the ring 39. The slot 36 in the opaque exposure control cylinder 35 extends approximately 120° around the cylinder and with the slot 40 in the aperture ring 39 it, therefore, defines a maximum exposure aperture of 120° around the fluorescent lamp 18. Since the opaque exposure control cylinder 35 is only secured to the support deck 10 by the single fastener 31 on its axis it may be rotated with respect to the aperture ring 39 to lessen the exposure aperture.

Three bearing support bolts 42 extend through the aperture ring 39 parallel to the axis of the lamp 18 and are spaced around the aperture ring 39 generally at 120° intervals. A pair of similar bearings 44 are supported for rotation one at each end of each support bolt 42. Each bearing 44 is formed with a flange which is positioned away from the aperture ring 39 and the body of each bearing is formed with a diameter sufficient to project slightly beyond the body portion of the aperture ring 39.

The film support rings 15 and 16 are supported coaxially on the bearings 44 for rotation about the axis of the lamp 18. The rings 15 and 16 are similarly formed to extend from the flange of their associated bearings equal distances to define a support ledge 46 for the normally unimaged opposed longitudinal edges of an original film 50. To permit duplication of information, such as code markings for rapid identification of frames on the film, contained on the longitudinal edges of the original film 50, the support ledges 46 may be formed of a transparent material (as illustrated) and bonded to the remainder of the rings 15 and 16 or the rings 15 and 16 may be formed entirely of a transparent material. Each ring 15 and 16 is formed with s shoulder 47 which abuts the support area for the original film on the support ledges 46. The shoulders 47 extend radially outward a distance generally equal to the thickness of the original film 50 and a duplicating film 51 in intimate contact with the original film to define a guide for the combination around the lamp 18. From the shoulder 47 the rings 15 and 16 are beveled outward to aid in threading an original film and a duplicating film onto the support ledges 46 of the rings. The aperture ring 39 is formed centrally with a thin band 41 extending around a major portion of its circumference, which band 41 holds the support rings 15 and 16 on their bearings 44 when the original film 50 and the duplicating film 51 are removed. The width of this band 41 is less than the distance between the rings 15 and 16 when the original film 50 and duplicating film 51 are supported on the ledges 46 of the rings 15 and 16 so that the rings can freely rotate on the bearings 44 when in use.

As an original film 50 and a duplicating film 51 are transported in intimate contact around the duplicating station 13 past the exposure aperture they must be maintained at a constant radius from the lamp 18 to produce the desired uniform exposure of the duplicating film. To assure this result the stiffness of the original film 50 must be considered when constructing the support rings 15 and 16 to prevent buckling of the film across its width between the rings as it is transported around the duplicating station. The tendency of a film to buckle between the rings 15 and 16 may be reduced by increasing the longitudinal edge support area of the film on the film support ring ledges 46 and also by decreasing the radius of curvature of the film support area. In one specific example a 16 mm original film on a 0.003 inch (0.076 mm) thick polyester base is properly supported when the film support ring ledges 46 have a 4 inch (10 cm) external diameter and support 0.02 inch (0.50 mm) of the longitudinal edges of the original film.

A second generally cylindrical cap 53 completes the light shield around the lamp 18. The cap is formed with a central aperture to fit around the opaque exposure control cylinder 35 and it is secured to the aperture ring 39 to remain stationary while the opaque exposure control cylinder 35 may be rotated within it. Additional radiation shielding is afforded externally of the exposure station 13 by a sheet metal radiation shield 49 secured to the support deck 10 and extending around the apertured portion of the duplicating station 13.

The original film supply and take-up reels 11 and 12, the duplicating supply and take-up reels 22 and 23 and a plurality of guide rollers are mounted on the support deck 10 to be aligned with the film support area defined by the film support ledges 46 of the rings 15 and 16 at the duplicating station 13. The original film supply reel 11 is positioned on the side of the duplicating station 13 opposite the exposure aperture defined by slots 36 and 40 in the exposure control cylinder 35 and the aperture ring 39. The original film path extends from reel 11 around a first guide roller 56 positioned adjacent the duplicating station 13 and then onto the support ledges 46 at the duplicating station. The original film path includes the support area at the duplicating station 13 and the film is supported thereon around a major portion of the duplicating station to assure that it will be properly supported for duplication in the exposure apertured area of the duplicating station 13. From the duplicating station the original film guide path extends around a second guide roller 59 and a third guide roller 60 and then onto the original film take-up reel 12.

The duplicating film supply reel 22 is positioned to one side of the duplicating station 13 and the duplicating film path extends therefrom over a guide roller 62, and then around the duplicating station 13. The guide roller 62 guides the duplicating film 51 into intimate contact with the original film 50 at the duplicating station 13. The duplicating film continues around the duplicating station 13 in intimate contact with the original film 50 until it is separated therefrom by passing around an offset guide roller 64 that is positioned adjacent the second guide roller 59 in the original film guide path. From the offset guide roller 64 the duplicating film path extends around guide rollers 66, 68 and 70. From guide roller 70 the film path is wrapped around a major portion of the capstan 24 by guide roller 72 positioned adjacent the capstan 24, and the film path then extends from guide roller 72 through the processor 25 on a straight line to a turn around guide roller 74 and around guide roller 75 onto the duplicating film take-up reel 23.

The capstan 24 is suitably driven at a constant speed in use and is preferably formed with a polyurethane periphery to provide frictional engagement with the backing of the duplicating film 51. The capstan 24 forms the drive for moving the original film 50 and the duplicating film 51 past the duplication station 13 in intimate contact and at the same velocity. The original film supply reel 11 and the original film take-up reel 12 are each supported on a rotatable spindle which spindles are independently driven by suitable means such as AC torque motors (not shown). The original film supply and take-up reels 11 and 12 are driven in counter balanced relationship so that the original film 50 may be easily withdrawn from the supply reel 11 and the withdrawn film will be wound on the take-up reel 12. The duplicating film supply reel 22 is further provided with a brake to provide back tension in the duplicating film 51 as the duplicating film is pulled from it by the capstan 24. The duplicating film take-up reel 23 is driven through a slip clutch to take up duplicating film that is fed by the capstan 24.

The film processor 25 is aligned with the duplicating film guide path between guide rollers 72 and 74, and when the duplicating films are light-sensitive and heat-developable the processor, as illustrated, subjects the duplicating films to heat sufficient to cause development of the image as the films are moved through the processor. An example of the type of duplicating film contemplated is disclosed in U.S. Pat. No. 3,457,075 as a light-sensitive heat-developable sheet material containing a photosensitive silver halide in catalytic association with an image-forming oxidation-reduction reaction mixture of organic salt and reducing agent. The heat processor illustrated has a narrow longitudinal opening 77 in the frame through which the heat-developable duplicating film 51 may pass between chambers 79 through which air heated by coils 81 is forced by fans 82 onto opposite faces of the film. The film processor 25 also includes means, such as air knives 84, for cooling the film after it has passed through the heating portion of the processor to prevent over developing.

In operation, the original film is initially threaded from its supply reel 11 to its take-up reel 12 around the duplicating station 13. In doing so the original film moves between the beveled edges of the film support rings 15 and 16 at the duplicating station. As the original film is placed in tension between its supply and take-up reels 11 and 12 it is drawn down the beveled edges of the support ring 15 and 16 and onto the ledges 46 defining the film support area. In moving onto the support area the original film causes the rings 15 and 16 to move against the flanges of the bearings 44 thereby to eliminate any contact between the rings 15 and 16 and the band 41 around the aperture ring 39. The duplicating film is then threaded from its supply reel 22 along its guide path around the duplicating station 13 in intimate contact with the original film 50 and along the remaining portion of its guide path over the capstan 24, through the film processor 25 and onto the duplicating film take-up reel 12.

Operation of the capstan 24 moves the duplicating film and, due to the intimate contact between the original film 50 and the duplicating film 51 at the duplicating station 13, the original film is driven by friction from the duplicating film at the same velocity as the duplicating film is moved by the capstan 24. As the duplicating film 51 is moved in intimate contact with the original film past the duplicating station it is exposed. The duplicating film is then separated from the original film by guide roller 64 and passes along its guide path through the heat processor 25. The duplicating film 51 is developed in the processor 25 to produce visible images thereon corresponding to the images on the original film 50. As the duplicate film leaves the processor it is cooled by a flow of air from the air knives 84 to prevent over developing. Finally, the duplicating film is wound onto the take-up reel 12.

Having thus described the present invention,
What is claimed is:

1. A duplicating station at which graphic information contained on an original photographic film may be duplicated on a radiation sensitive duplicating film comprising:
   means defining a radiation source which will produce generally uniform radiation at equal radial distances from and along a centerline, and
   a pair of spaced coaxial rings supported for free rotation with their axes coincident with said centerline of said source of radiation, the peripheral surfaces of said rings defining spaced coaxial support surfaces for independently supporting the opposed longitudinal edges of a said original film at a constant radius from said centerline to position the unsupported central portion of a said original film at said constant radius from said centerline with the original film between said source of radiation and a said duplicating film in intimate contact with the original film to permit radiation from said source to be projected through the original film to image the radiation sensitive duplicating film, each of said rings being formed with a shoulder abutting the support area for a said original film to define an original film guide path around said source of radiation.

2. A duplicating station as recited in claim 1 wherein at least the portions of said rings between a said supported original film and said source of radiation are formed of a transparent material to permit duplication of information contained on said supported longitudinal edges of a said original film.

3. A duplicating station as recited in claim 1 including adjustable means for shielding a said duplicating film in intimate contact with a said original film from said radiation around at least a major portion of said support area about said source of radiation, whereby the degree of exposure of a said radiation sensitive duplicating film may be adjusted.

4. Apparatus for duplicating graphic information contained on an original photographic film on a radiation sensitive duplicating film comprising:
   means defining a radiation source which will produce generally uniform radiation at equal radial distances from and along a centerline,
   a pair of spaced coaxial rings supported for free rotation with their axes coincident with said centerline of said source of radiation, the peripheral surfaces of said rings defining spaced coaxial support surfaces for independently supporting the opposed longitudinal edges of a said original film at a constant radius from said centerline of radiation to position the unsupported central portion of a said original film at said constant radius from said centerline of radiation with the original film between said source of radiation and a said duplicating film in intimate contact with the original film to permit radiation from said source to be projected through the original film to image the radiation sensitive duplicating film, each of said rings being formed with a shoulder abutting the support area for a said original film to define an original film guide path around said source of radiation,
   means for guiding a said original film to position a portion of a said original film for support on said means for supporting the longitudinal edges thereof,
   means for guiding a said duplicating film to place a portion thereof in intimate contact with a said supported portion of a said original film, and
   drive means for moving a said supported original film and a said duplicating film in intimate contact therewith to progressively image a said radiation sensitive duplicating film.

5. Apparatus as recited in claim 4 wherein at least the portions of said rings between a said supported original film and said source of radiation are formed of a transparent material to permit duplication of information contained on said supported longitudinal edges of a said original film.

6. Apparatus as recited in claim 4 including adjustable means for shielding a said duplicating film in intimate contact with a said original film from said radiation around at least a major portion of said support area about said source of radiation, whereby the degree of exposure of a said radiation sensitive duplicating film may be adjusted.

7. Apparatus as recited in claim 4 including means for supporting a supply of said original film, means for supporting a supply of said radiation sensitive duplicating film, means for separating said radiation sensitive film from said original film after travel past said source of radiation, means for taking up said original film, and means for taking up said radiation sensitive duplicating film.

8. Apparatus as recited in claim 7 including a heat processor between said means separating said duplicating film from said original film and said means for taking up said duplicating film whereby exposed radiation sensitive heat-developable film may be developed before proceeding to said take-up means.

9. Apparatus as recited in claim 8 including means for cooling said radiation sensitive heat-developable film positioned between said heat processor and said take-up means to prevent over developing of said radiation sensitive heat-developable duplicating film.

* * * * *